W. LUNDY.
Lifting-Gate.
No. 164,849. Patented June 22, 1875.
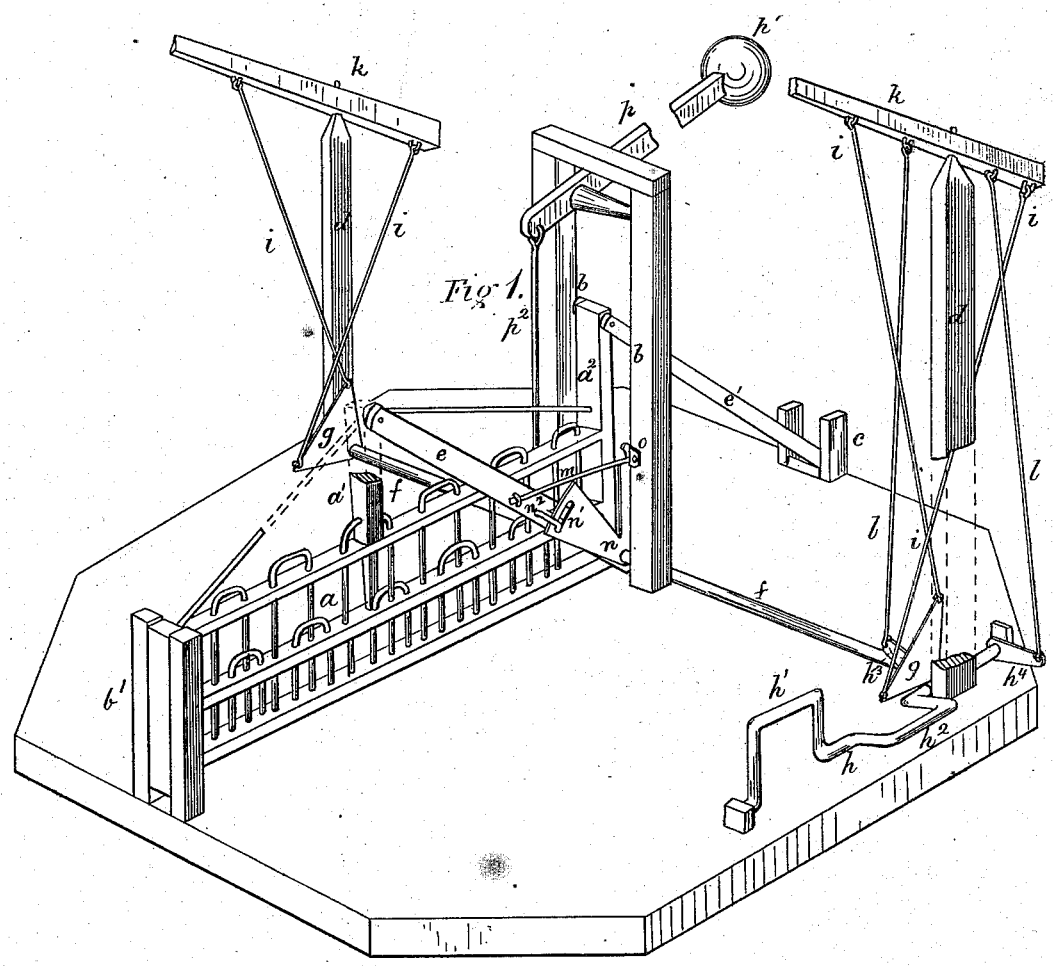
Fig. 1.
Fig. 2.
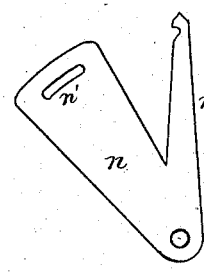
Witnesses.
J. B. Holderby
B. Coventry
Inventor.
William Lundy
per R.S. & A.P. Lacey
attys

UNITED STATES PATENT OFFICE.

WILLIAM LUNDY, OF ATALISSA, IOWA.

IMPROVEMENT IN LIFTING-GATES.

Specification forming part of Letters Patent No. 164,849, dated June 22, 1875; application filed April 3, 1875.

*To all whom it may concern:*

Be it known that I, WILLIAM LUNDY, of Atalissa, in the county of Muscatine and State of Iowa, have invented certain new and useful Improvements in Gates; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in that class of farm-gates which are not hinged to a post, but are pivoted to a series of supporting-arms, and which, in opening, are raised vertically on said arms, and carried back in a direct line out of the carriage-way; and it consists in the construction, combination, and arrangement of the several parts, hereinafter fully described, and pointed out in the claims.

In the drawings, Figure 1 is a perspective of a gate with my improvements attached, and Fig. 2 is a detail view of a portion of the operating parts.

$a$ is the gate, constructed in any ordinary manner, and having its center framing-piece $a^1$ and the rear piece $a^2$ extended above the top cross-piece, as shown, the top of the piece $a^1$ being partially broken away to show the operating parts on the opposite side of the gate. $b$ are two posts, between which the rear end of the gate rests when closed, and between which the gate passes in opening and closing. They extend far enough above the gate to afford ample space for the raising of the latter on the ends of the pivoted arms, hereinafter described, and permit the same to pass clear of the cross-piece and devices on the top of said posts. $b'$ are two posts placed on the opposite side of the carriage-way. They receive the front end of the gate, and hold the latter, when closed, from injury by lateral force. $d$ are two posts, placed on opposite sides of the gate, and on the same side of the roadway, and in a line with the posts $b$. They are set off from the posts $b$ a distance slightly more than the length of a horse and buggy or other wheeled vehicle. $e\ e'$ are two pairs of carrying-arms, on which the gate, when being opened or closed, is lifted and carried backward or forward. They are arranged on the sides of the gate, so that the latter moves between them. The arms $e$ have their upper or forward ends pivoted to the top of the center projecting frame-piece $a^1$, and their lower or rear ends are secured on the tumbling-shaft, hereinafter described, at the rear lower end of the posts $b$. The arms $e'$ are pivoted to the top of the framing-piece $a^2$ and to the studs $c$ set in the ground, and so arranged as to be parallel at all times to the front arms $e$. $f$ is a tumbling-shaft, arranged parallel with the roadway, and extends between, and has its ends journaled in, the posts $d$. It passes on the rear side of, and is slightly let into, the bottom of the posts $b$, where it is held from springing or bending outward by suitable fastenings. To it are attached a portion of the operating devices of my invention. $g$ are triangular cranks on the ends of the shaft $f$, by which the latter is turned. $h$ is a crank-lever, having the two cranks $h^1\ h^2$, constructed in ordinary manner, and by which the gate is thrown open or closed by the passing thereover of the wheels of the vehicle. It is placed at right angles to the shaft $f$, with the cranks $h^1\ h^2$ extending out into the carriage-way. $h^3\ h^4$ are two short arms on the opposite end from the cranks $h^1\ h^2$. The arm $h^3$ is in line with the crank $h^1$, and $h^4$ is in line with $h^2$. But one crank-lever $h$ is shown. Two are used, there being two complete sets of operating devices the same in construction, and placed on opposite sides of the gate. $k$ is a lever, pivoted near its center to the top of the post $d$. $i$ are two rods, secured by staples to opposite ends of the lever $k$. They extend to, and are attached to, the crank $g$, each rod being secured to that point of the crank diametrically opposite to that end of the lever to which the upper end thereof is secured, as shown. By the lever $k$ and the rods $i$ acting on the crank $g$ the shaft $f$ is turned, the arms $e$ are raised, and the gate is thrown open or closed, as desired. $l$ are two rods, which connect the lever $k$ with the short arms $h^3\ h^4$ on the crank-lever $h$, in such manner that the lever $k$ can be operated, and the gate opened or closed by driving the wheels of the vehicle over one or the other of the cranks $h^1\ h^2$. $m$ is a latch or catch for locking the gate when closed. One end is secured to one of the arms $e$. The other end is free, and when not pressed passes clear of the post $b$ in the opening and closing of the gate. When the latter is closed, and pressure or force applied, as hereinafter explained, the free end of the latch will be forced outward from the gate and against the plate $o$, and will lock the gate so that it cannot be opened by any force applied at any point thereon. $n$ is a cam or arm rigidly attached to the shaft $f$ at the rear end of the gate. It extends upward along the arm $e$, and is provided with the cross-slot $n^1$, through which is driven the staple or pin $n^2$. In opening or closing the gate it has a play the length of the slot on the staple. By it the gate is raised on the arms $e$ $e'$. It has attached the spring $n^3$, which extends upward between the gate and the latch $m$, and presses the latter against the plate $o$ when the gate is closed. The slot $n^2$ permits the arm $n$ to be thrown far enough back, as shown, to release the latch $m$, the latter springing away from the post, and unlocking the gate before any power is exerted on the gate itself. $p$ is a lever, pivoted to the top of the posts $b$. It has on its upper or rear end the equalizing-weight $p^1$. Its opposite end is connected with the gate by the vertical rod $p^2$. The weight and lever are so arranged with reference to the gate that the power necessary to raise the gate is materially lessened, and the descent of the same made gentle and easy, relieving any shock that would be consequent on a rapid descent of the gate.

It will be seen that by pulling on the lever $k$, or driving over the proper crank on the crank-lever $h$, the gate will be unlocked and thrown open, or will be closed and locked, as desired.

Having described my invention, what I claim, and desire to secure by Letters Patent, is—

1. The combination, with the shaft $f$, crank $h$, and lever $k$, of the arms $h^3$ $h^4$, crank $g$, rods $i$ and $l$, when arranged as and for the purpose set forth.

2. The combination, with the shaft $f$, and arms $e$ of the gate $a$, of rod $m$, arm $n$, having the spring $n^3$, for the purposes set forth.

In testimony that I claim the foregoing as my own, I affix my signature in presence of two witnesses.

WILLIAM LUNDY.

Witnesses:
LEWIS J. WATSON,
BENJ. OVERMAN.